United States Patent
Limaye et al.

(10) Patent No.: US 10,592,640 B2
(45) Date of Patent: *Mar. 17, 2020

(54) SYSTEM AND METHOD FOR ANALYZING A DEVICE

(71) Applicant: COMCAST CABLE COMMUNICATIONS, LLC, Philadelphia, PA (US)

(72) Inventors: Bahar Limaye, Leesburg, VA (US); Atif Ghauri, Bensalem, PA (US); Sean Wechter, Broomall, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/722,950

(22) Filed: Oct. 2, 2017

(65) Prior Publication Data

US 2018/0137258 A1    May 17, 2018

Related U.S. Application Data

(63) Continuation of application No. 13/441,397, filed on Apr. 6, 2012, now Pat. No. 9,817,951.

(51) Int. Cl.
*G06F 21/10* (2013.01)

(52) U.S. Cl.
CPC .................................. *G06F 21/10* (2013.01)

(58) Field of Classification Search
CPC ....................................................... G06F 21/10
See application file for complete search history.

(56) References Cited

U.S. PATENT DOCUMENTS

| | | |
|---|---|---|
| 8,230,505 B1 | 7/2012 | Ahrens et al. |
| 9,817,951 B2 | 11/2017 | Limaye et al. |
| 2006/0150256 A1 | 7/2006 | Fanton et al. |
| 2007/0180509 A1 | 8/2007 | Swartz et al. |
| 2008/0039209 A1 | 2/2008 | Chen et al. |
| 2009/0125885 A1 | 5/2009 | Gayathri et al. |
| 2010/0064379 A1 | 3/2010 | Cassett et al. |
| 2012/0254982 A1 | 10/2012 | Sallam |
| 2013/0014221 A1 | 1/2013 | Moore et al. |
| 2013/0269043 A1 | 10/2013 | Limaye et al. |

OTHER PUBLICATIONS

Apvrille, Axelle, et al., "DigSig: Runtime Authentication of Binaries at Kernel Level." In LISA, vol. 4, pp. 59-66. (2004).
Choi, SuGil, et al., "Implementation of a TCG-based trusted computing in mobile device." In Trust, Privacy and Security in Digital Business, pp. 18-27.(2008).
Jana, S.; et al., "TxBox: Building Secure, Efficient Sandboxes with System Transactions," Security and Privacy (SP), 2011 IEEE Symposium on , vol., No., pp. 329,344, May 22-25, 2011.
U.S. Appl. No. 13/441,397 (U.S. Pat. No. 9,817,951), filed Apr. 6, 2012 (Nov. 14, 2017), Limaye, et al.

*Primary Examiner* — Nirav G Patel
(74) *Attorney, Agent, or Firm* — Ballard Spahr LLP

(57) ABSTRACT

A system and method for analyzing a device are disclosed. In an aspect, a method can comprise determining a parameter of a device at a kernel level of a software stack associated with the device, analyzing the parameter to determine an event state, comparing the event state to a white list to determine a state of an alert trigger, and generating an alert in response to the determined state of the alert trigger.

20 Claims, 6 Drawing Sheets

SYSTEM AND METHOD FOR ANALYZING A DEVICE

CROSS REFERENCE TO RELATED PATENT APPLICATION

This application is a continuation of U.S. application Ser. No. 13/441,397, filed Apr. 6, 2012, which is herein incorporated by reference in its entirety.

BACKGROUND

Electronic device compromise can result in substantial business and personal loss. Historically, information technology systems have been monitored to detect compromised devices from a server-side perspective, rather than from a client. However, conventional server-side security monitoring does not provide sufficient protection against the broad range of new security threats. New threats exploit modem open communication protocols and leverage state-of-the-art processing power on advanced and non-proprietary operating systems.

Existing protection methods are limited and include: network controls on distribution servers that aggregate and transport content, embedded controls in outdated protocols such as simple network management protocol (e.g., SNMPv1 SNMPv2), and protection of video assets through digital rights management (DRM) cryptographic keys.

Next-generation video delivery devices enable unprecedented capabilities in comparison to legacy devices. Conventional server-side controls are not configured to detect compromise of a video delivery endpoint. In the age of the advanced persistent security threat, a proactive response is needed to provide a comprehensive security solution.

SUMMARY

It is to be understood that both the following general description and the following detailed description are exemplary and explanatory only and are not restrictive, as claimed. Provided are methods and systems for analyzing and/or monitoring a device. The system and methods of the present disclosure can be used to monitor physical and/or logical parameters of devices for potential security threats. The systems and methods of the present disclosure can be used to monitor operational patterns of a device to identify potential security threats. In an aspect, the systems and methods can be implemented as a client-side monitoring resource.

In an aspect, the systems and methods of the present disclosure can utilize anomic motion detection (AMD) to proactively monitor the security disposition of a device (e.g., video delivery device, content consuming device) resulting in risk reduction and cost avoidance related to security breaches. The AMD technology can leverage pattern recognition from logical access to embedded software and physical access to ports or sockets associated with a particular device.

In an aspect, an endpoint device should only be modified using prescribed patterns and events. Thus, any movement (e.g., changes, detected events or patterns) deviating from such an established "white list" can result in a notable event (e.g., alert trigger event) to be investigated. For example, if a hard-drive is connected to a universal serial bus (USB) port and mounted as a read/write resource, an unauthorized action may be forthcoming.

In an aspect, a method for analyzing a device can comprise determining a parameter of a device at a kernel level of a software stack associated with the device and analyzing the parameter to determine an event state. As an example, the event state can be compared to a white list to determine a state of an alert trigger and an alert can be generated in response to the determined state of the alert trigger.

In an aspect, a method for analyzing a device can comprise determining a plurality of parameters of a device, detecting a change in one or more of the plurality of parameters of the device, and defining a pattern of operation of the device based upon one or more of the plurality of parameters and the detected change in the one or more of the plurality of parameters. As an example, the pattern of operation of the device can be compared to a comparator pattern to determine an event state and an alert can be generated in response to the determined event state.

In an aspect, a system can comprise a memory for storing a detection element and a processor in communication with the memory. The processor can be configured to determine a parameter of a device at a kernel level of a software stack associated with the device using the detection element, to analyze the parameter to determine an event, to compare the event to a white list to determine a state of an alert trigger, and to generate an alert in response to the determined alert trigger state.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
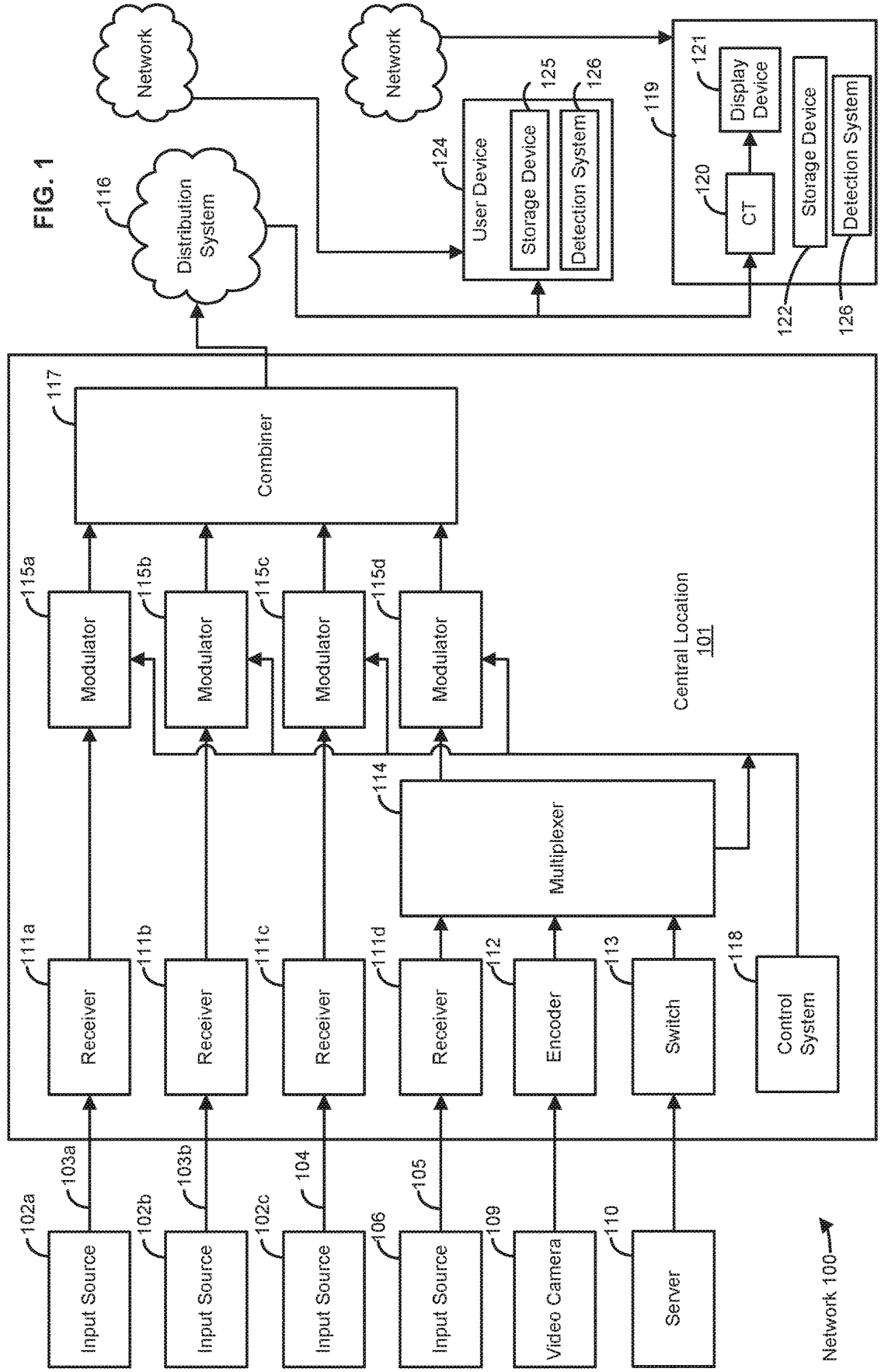
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, a system and network can be configured to analyze one or more of a parameter and operation of a device. In an aspect, one or more of a detected parameter, a detected change in parameter, and a pattern of operation can trigger an alert.

FIG. 1 illustrates various aspects of an exemplary network in which the present methods and systems can operate. The present disclosure relates to systems and methods for analyzing a device. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can create content or receive content from a variety of sources 102a, 102b, 102c. The content can be transmitted from the source to the central location 101 via a variety of transmission paths, including wireless satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include, for example, a single content item or a multiplex that includes several content items. In an aspect, the central location 101 can create and/or receive application, such as interactive applications. Such applications can be related to a particular content.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators, 115*a*, 115*b*, 115*c*, and 115*d*, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or communications terminal (CT) can decode, if needed, the signals for display on a display device 121, such as on a television set (TV) or a computer monitor. Various wireless devices may also be connected to the network at, or proximate, user location 119. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's 120, display devices 121, central locations 101, DVR's, home theater PC's, and the like. As an example, a storage device 122 can be in communication with one or more of the CT 120, the display device 121, and the central location 101 to send/receive content therebetween. As a further example, the storage device 122 can be located remotely from the user location 119, such as a network storage. In an aspect, a software such as an operating software, detection software, or application software can be stored on the storage device 122.

In an aspect, user location 119 is not fixed. By way of example, a user can receive content from the distribution system 116 on a mobile device such as a laptop computer, PDA, smartphone, UPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be an CT, a set-top box, a television, a computer, a smartphone, a laptop, a tablet, a multimedia playback device, a portable electronic device, and the like. As an example, the user device 124 can be an Internet Protocol compatible device for receiving signals via a network such as the Internet or some other communications network for providing content to the user. It is understood that other display devices and networks can be used. It is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content therebetween. As a further example, the storage device 125 can be located remotely from the user device 124, such as a network storage medium. In an aspect, a software such as an operating software, detection software, or application software can be stored on the storage device 125.

In an aspect, one or more of the CT 120, the user device 124, or other device or system can be in communication with a detection system 126 or device or element. The detection system 126 can be disposed remotely from one or more of the CT 120 and/or the user device 124 and in communication therewith. As an example, the detection system 126 can comprise a detection software (e.g., detection system 126) for detecting one or more of a logical and/or physical parameter or change in parameter. As a further example, the detection system 126 can be embedded in a software stack (e.g., at the kernel level) such as the OpenCable Application Platform (OCAP), JAVA software, etc.). In an aspect, the detection system 126 can be configured to detect logical or physical parameter of the CT 120 and/or the user device 124 such as, for example, changes to key system files, version control, hot plugs (e.g., USB, serial advanced technology attachment, eSATA) device types, connection types (e.g., secure shell (SSH), transmission control protocol (TCP), user datagram protocol (UDP), local area network (LAN), command line invocation, excessive network bandwidth use, etc. As a further example, the detections system 126 can be configured to determine if the detected parameters amount to an event. In an aspect, a user can couple a storage drive to the user device 124. As an example, the coupling of the storage drive may be classified as an event. However, the detect of a coupled storage drive may not be classified as an event. As a further example, after the storage drive is coupled to the user device 124, the drive may be mounted as a read/write drive. Accordingly, the mounting of the drive as read/write can be classified as an event. In an aspect, any detected parameters or change in parameters can be designated as an event. As an example, once an event has been detected, analysis of the event (e.g., comparison against a list of acceptable events or restricted events or patterns) can be used to determine of the event qualifies as a threat or concern. As a further example, an alert can be triggered in response to the detection of an event that is determined to be a threat.

In an aspect, a plurality of detected events can define an operational pattern of the monitored device. Accordingly, the detection system 126 can leverage Anomic Motion Detection (AMD) technology and/or pattern recognition algorithms to proactively monitor the security disposition a particular device or system including, for example, logical access to the embedded software and/or physical access to hardware ports and sockets of the monitored device. As an example, a trojan (e.g., loaded via USB hard-drive) could be coupled to a device and mounted as a read/write drive on the device. The trojan can run a sequence of commands using SSH or Telnet. Accordingly, the detection system 126 detects the coupling of the USB, the mounting of the read/write drive, and the sequence of SSH command (e.g., at real-time) and compares the detected parameters to a pattern baseline. In an aspect, a pattern baseline can be embodied as a white list of acceptable parameters, sequence, and or patterns, whereby white listed behavior is not classified as a threat. Suspicious patterns, on the other hand, can be reported to an upstream service (e.g., central location 101, server at an upstream data center, etc.). In an aspect, a security analyst or program can review the suspicious parameters and/or patterns and can respond to the event. Remediation efforts can be taken in response to the detected suspicious parameters and/or analysis conducted based on the suspicious parameters and/or patterns.

Figure 2:
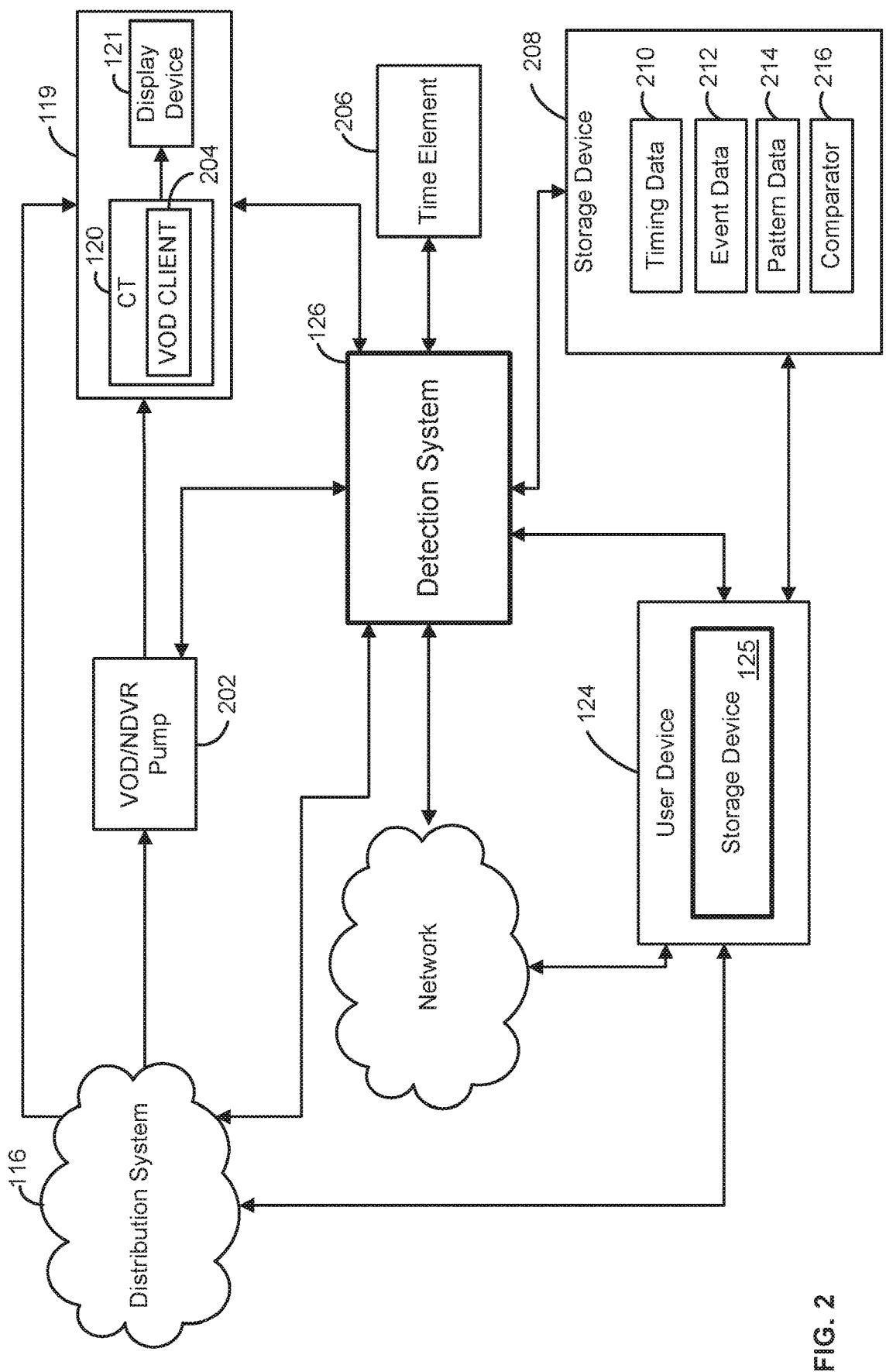
FIG. 2 is a block diagram on an exemplary network.

FIG. 2 illustrates various aspects of an exemplary system in which some of the disclosed methods and systems can operate. As an example, the distribution system 116 can communicate with the CT 120 or other content processing device at the user location 119 via a linear transmission, for example. As a further example, the distribution system 116 can transmit signals to a video on demand (VOD) pump 202 or network digital video recorder pump for processing and delivery to the user location 119.

In an aspect, the CT 120 or a set-top box can comprise a software component such as VOD client 204 to communicate with a VOD server (e.g., server 110). The VOD client 204 can communicate requests to the VOD server or a VOD management system in communication with the VOD server to configure the VOD pump 202 to transmit content to the CT 120 for displaying the content to a user. Other content distribution systems can be used to transmit content signals to the user location 119. The foregoing and following examples of video transmissions are also applicable to transmission of other data. As an example, content can be received and stored for subsequent playback.

In an aspect, the user device 124 can receive content from the distribution system 116, the Internet Protocol network such as the Internet, and/or a communications network such as a cellular network, for example. Other network and/or content sources can transmit content to the user device 124. As an example, the user device 124 can receive streaming data, audio and/or video for playback to the user. As a further example, the user device 124 can receive user experience (UX) elements such as widgets, applications, and content for display via a human-machine interface. In an aspect, user device 124 can be disposed inside or outside the user location 119. As an example, content can be received and stored for subsequent playback.

In an aspect, the detection system 126 or detection element can be in communication with the distribution system 116, the CT 120, the user device 124, the Internet, and/or a communication network to receive information relating to content being delivered to a particular user. In an aspect, the detection system 126 can be integrated with (e.g., as a software component) one or more of the CT 120 and the user device 124 or other device, as discussed in reference to FIG. 1. As an example, other communications elements such as software, virtual elements, computing devices, router devices, and the like, can comprise or serve as detection system 126. As a further example, the detection system 126 can detect and/or analyze one or more of parameters, changes in parameters, operational patterns, and logical or physical events, as described in further detail herein. In an aspect, the detection system 126 can be disposed remotely from the user location 119. However, the detection system 126 can be disposed anywhere, including at the user location 119 to reduce network latency, for example.

In an aspect, a time element 208 can be in communication with at least the detection system 126 to provide a timing reference thereto. As an example, the time element 206 can be a clock. As a further example, the time element 206 can transmit information to the detection system 126 for associating a time stamp with a particular event received by the detection system 126. In an aspect, the detection system 126 can cooperate with the time element 206 to associate a time stamp with events having an effect on a particular logical or physical parameter of the CT 120 and/or the user device 124 such as, for example, changes to key system files, version control, hot plugs (e.g., USB, eSATA, Serial), device types, connection types (SSH, TCP, UDP, LAN), command line invocation, excessive network bandwidth use, etc.

In an aspect, a storage device 208 can be in communication with the detection system 126 to allow the detection system 126 to store and/or retrieve data to/from the storage device 208. As an example, the storage device 208 can store data relating to one or more of timing data 210, a device parameter or event data 212, operational pattern data 214, and/or a comparator 216 such as a white list or black list. In an aspect, the timing data 210 can be a time stamp or other time marker for indicating a date and/or time associated with one or more of a transmission of content, a request for content, a request for playback, storage of content, deletion of content, and/or changes to key system files, version control, hot plugs (e.g., USB, eSATA, Serial), device types, connection types (SSH, TCP, UDP, LAN), command line invocation, excessive network bandwidth use, etc.

In an aspect, the event data 212 can comprise information relating to the physical and/or logical parameters or changes to the parameters of a particular device (e.g., CT 120, user device 124, or other device). This may include physical parameters generated by the operating system kernel ring buffer such as hot-plugs (hot-plug device (e.g., USB) is connected/disconnected), LAN cable connected (e.g., LAN link is up or down, an Ethernet cable is plugged in), hardware anomalies (e.g., a mismatch between the whitelisted and actual SCSI devices and DMA entries), interrupts (e.g., interrupts mismatch with the white list). Alternatively this may include logical parameters with critical file changes (e.g., MD5 file signatures for a configurable set of files and matches against a known set of file signatures), SSH/Telnet enabled (e.g., SSH is running, a session is established and/or when a connection is disconnected), network bandwidth (e.g., anomalous network bandwidth of all network interfaces), protocol mismatches (e.g., a mismatch between the TCP/UDP inbound server sockets and outgoing sockets and a white list), command line (e.g., command line calls do not match a white list of commands), version (e.g., version does not match a white list of versions), address resolution protocol (ARP) (e.g., ARP table does not match a whitelist of entries) and the like.

In an aspect, the pattern data 214 can comprise historical device parameter information, operational information, sequential operations, and temporal relationships of parameters and events. For example, pattern data 214 can comprise events based on time of action and resource invoked, such as a user connecting a USB device, mounting the device, and invoking an SSH process (e.g., all within 15 seconds every day at a particular time).

In an aspect, the comparator 216 can comprise one or more pre-defined events by which detected device parameters can be compared to determine if an event as occurred. As an example, changes in device parameters can be compared to a white list to determine of such changes constitute an alert triggering event. As a further example, one or more alert triggers can comprise hot-plugs, critical file changes, SSH/Telnet enabled, LAN link changes, network bandwidth, hardware anomalies, protocol mismatches interrupts, command line, versioning, and ARP. As a further example, user actions such as channel change, receiving voice calls or messages, and other user interactions can be comprised as alert triggers. In an aspect, when an event is detected that matches an alert trigger, an alert can be generated. However, if the event and or alert trigger is white listed, then the alert may not be generated. As an example, the alert triggers and states (e.g., white listed, black listed, allowed, active, inactive, priority of alert, severity of alert, etc.) of the alert triggers can be pre-defined for any particular device and/or user.

As described in greater detail below, a system and network can be configured to determine an event and to generate an alert for alert triggering events. In an aspect, a white list can comprise events that are allowed, wherein other detected events can cause the generation of alerts.

Figure 3:
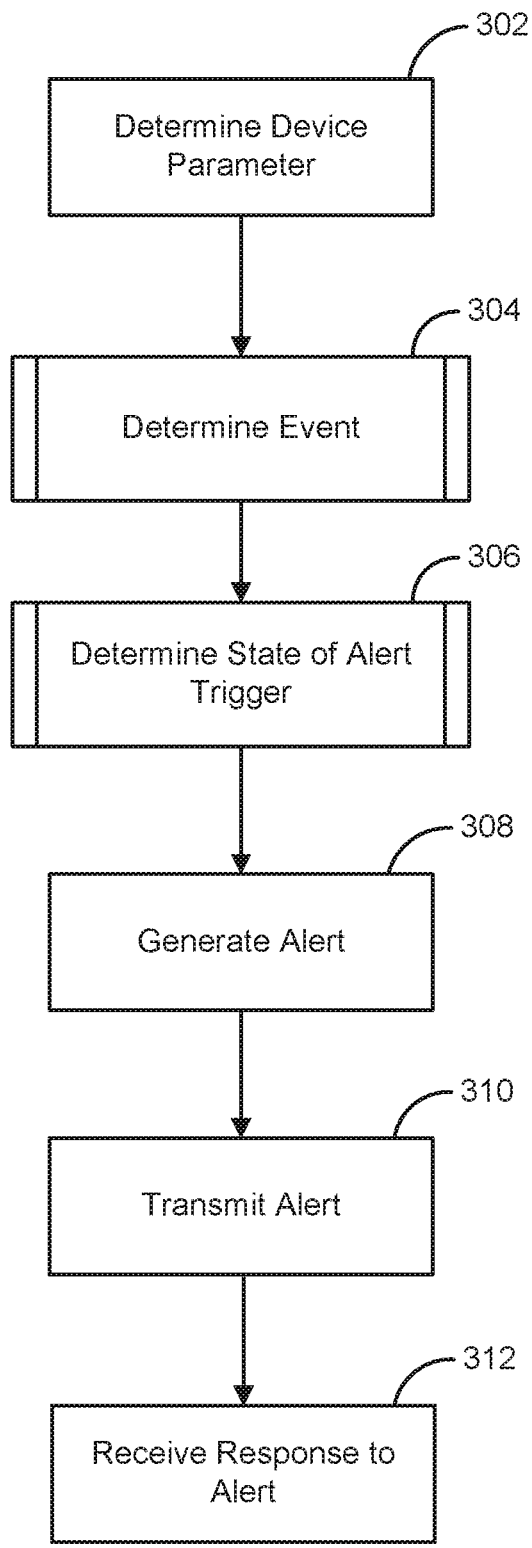
FIG. 3 is a flow chart of an exemplary method.

FIG. 3 illustrates a method for analyzing a device (e.g., CT 120, user device 124, or other device). In an aspect, in step 302, a parameter of a device can be determined (e.g., detected, obtained, measured, sensed, extracted, calculated). As an example, the parameter is determined at a kernel level of a software stack (e.g., OCAP, operating software, application software) associated with the device. As a further example, the parameter can relate to a physical and/or a logical aspect, pattern, operation, or the like, of the device. Any number of parameters can be determined. Various techniques for determining one or more parameters of the device can be used.

In an aspect, in step 304, the determined parameter can be analyzed to determine whether an event has occurred. As a non-limiting example, one or more parameters can be indicative of an event. As a further example, the determined parameter(s) can be compared to a pre-defined list of events or a comparator to determine whether an event has occurred.

Figure 4:
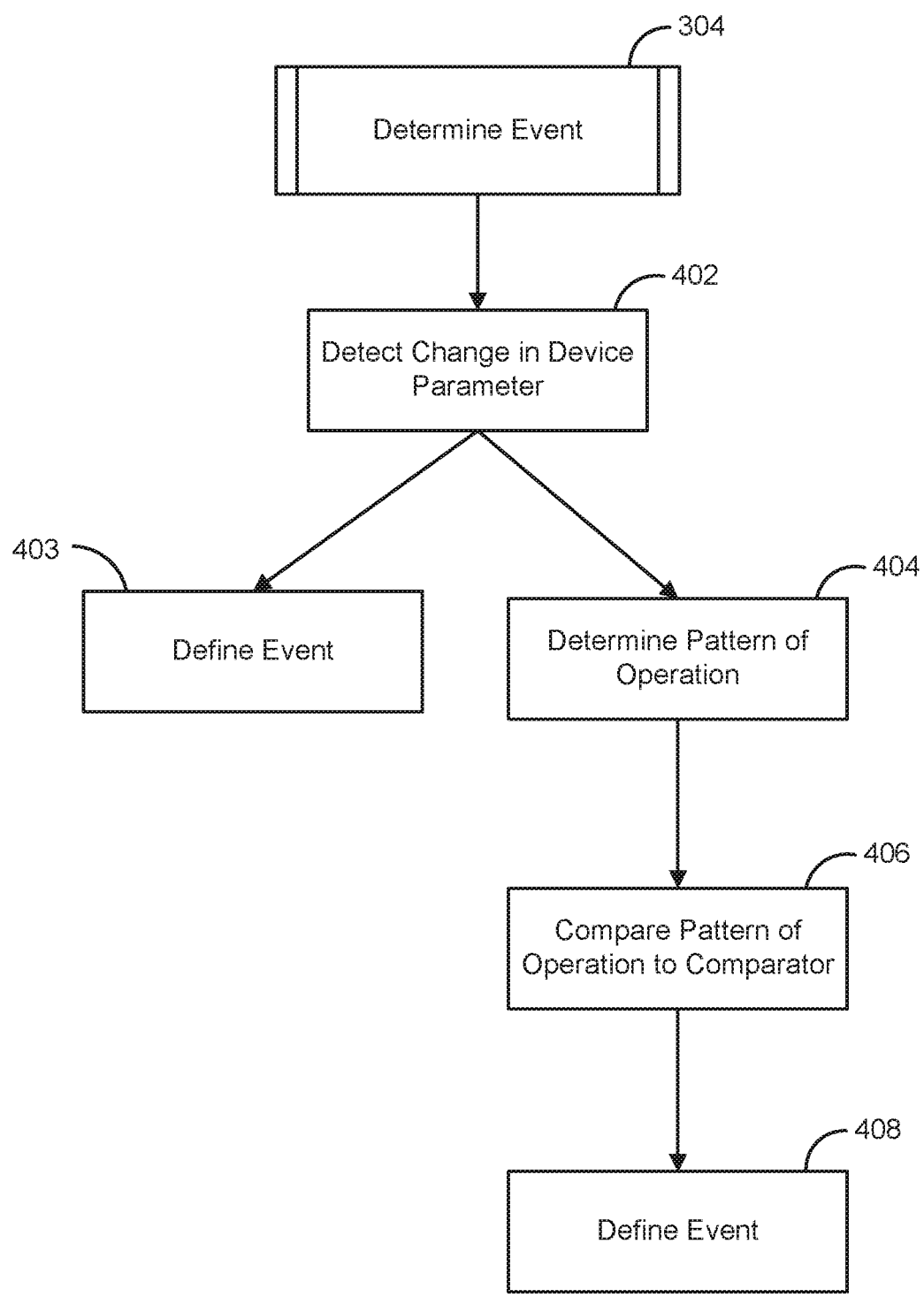
FIG. 4 is a flow chart of an exemplary method.

In an aspect, FIG. 4 illustrates a method for determining an event of step 304. In step 402, a change in a parameter of the device is detected. As an example, the change in the parameter can comprise detecting the addition of a parameter, a missing parameter, a change in data representing the parameter, or other detectable changes (e.g., physical and/or logical). In an aspect, in step 403, an event can be defined based upon the one or more parameters determined in step 302 and a change in one or more parameters determined in step 302. As an example, any change in any parameter can be indicative of an event. As a further example, a pre-defined list of events can be compared to the determined parameters and/or change in parameters to determine whether an event has occurred. In an aspect, parameters qualifying as an event can be pre-defined and/or modified.

In an aspect, in step 404, a pattern of operation can be determined. As an example, the pattern of operation can be determined based upon one or more of the parameters determined in step 302 and a change in the parameters determined in step 402. As a further example, the pattern of operation can comprise physical patterns and/or logical patterns. In an aspect, the pattern of operation can comprise a sequential or temporal series of events comprising physical and/or logical parameters, patterns, and detectable attributes. A pattern of operation may be invocation of remote access through SSH using a new physical hard-drive swapped in by a hacker and then mounted to the file system. This example includes a process change (SSH), physical device change (hard-drive), and attribute change (mounted drive with write permission).

In step 406, the determined pattern of operation of the device can be compared to a comparator or comparative pattern. As an example, the comparator can comprise a list of patterns that indicate an event has occurred. Accordingly, when a series of determined parameters and parameter changes matches a pre-defined comparator pattern, it can be determined that an event has occurred, at step 408.

Returning to FIG. 3, in step 306, a state of an alert trigger can be determined. As an example, the state of an alert trigger can be determined, at least in part, based upon the determined event(s) of step 304. In an aspect, the alert trigger can have an active state, wherein an alert can be generated in response to active state of the alert trigger. In an aspect, the alert trigger can have an inactive state, wherein an alert is not triggered. As an example, the alert trigger can have one or more states relating to priority, sensitivity, and/or severity. In an aspect, once an event or series of events is detected (e.g., detected parameters, patterns, and/or changes qualify as an event), a determination of whether the event should trigger a particular alert is made.

Figure 5:
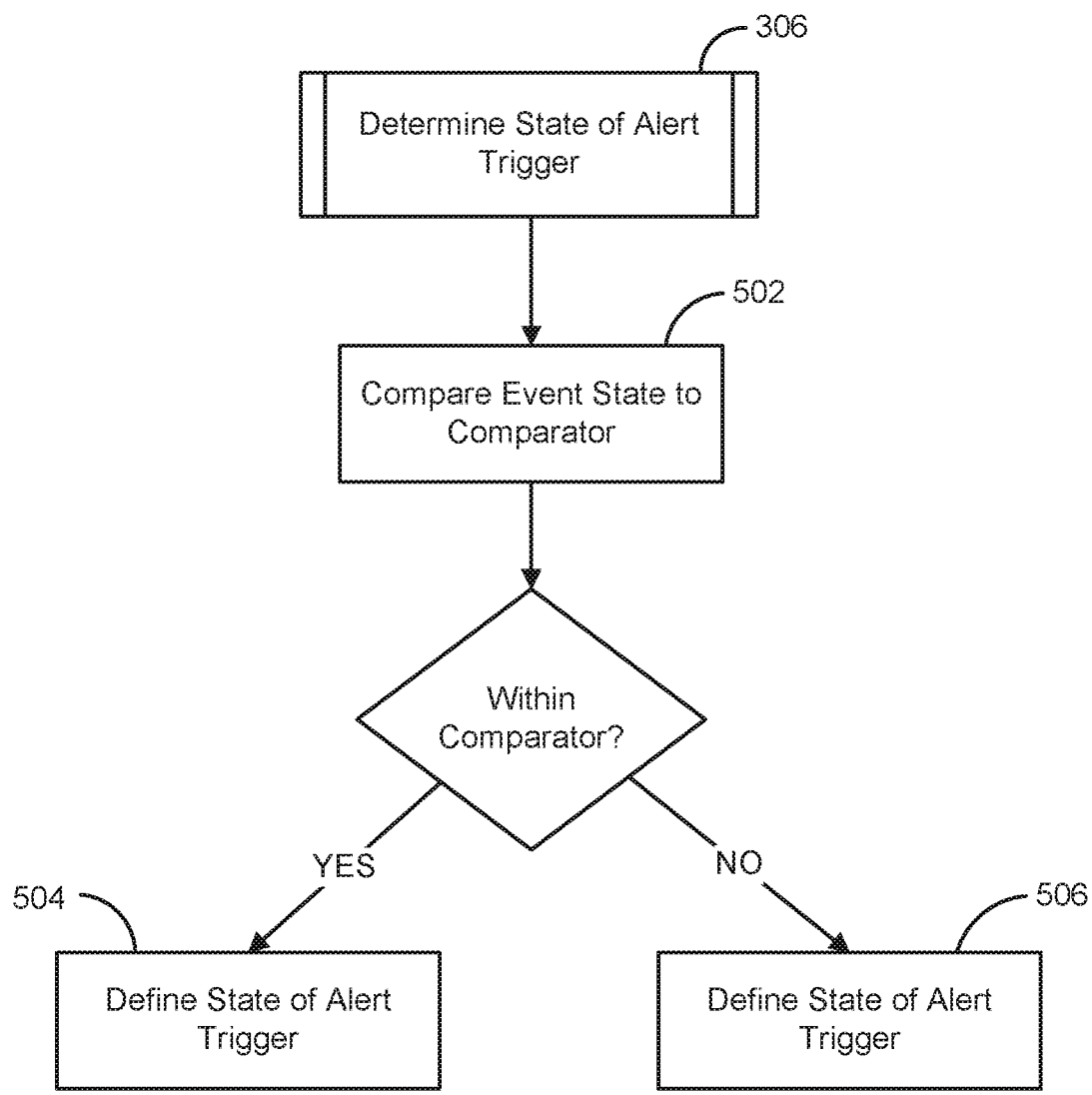
FIG. 5 is a flow chart of an exemplary method.

In an aspect, FIG. 5 illustrates a method for determining a state of an alert trigger of step 306. In an aspect, in step 502, the event state determined in step 304 is compared to a comparator (e.g., a white list) to determine the state of the alert trigger. As an example, the comparator (e.g., comparator 216) can comprise one or more pre-defined event identifiers having a state of the alert trigger (or alert level, alert action, etc.) associated therewith. In an aspect, certain determined events can be located within the comparator and the state of the alert trigger associated with the detected event can be defined from the information in the comparator, at 504. In an aspect, certain determined events can trigger an alert or define an alert state when the determined events are not located within the comparator, at 506. Any state of one or more alert triggers can be defined based upon inclusion or exclusion of a determined event relative to a comparator or reference.

Returning to FIG. 3, in step 308, an alert or notice can be generated in response to the determined state of the alert trigger. As an example, the alert can represent one or more states relating to priority, sensitivity, and/or severity. As a further example, the alert can be transmitted to a user device or other recipient as a notification of an event and/or for processing or remediation.

In an aspect, in step 310, the alert and/or information relating to the determined events and/or parameters can be transmitted to a computing device or storage device. As an example, the alert and/or other information can be transmitted to a remote computing device for further analysis (e.g., aggregate analysis, historical analysis, statistical analysis, remediation measures, etc.). As a further example, the alert and/or other information can be transmitted to a storage device for storage.

In an aspect, in step 312, a response can be received from a recipient of the alert and/or other information. As an example, the response can comprise remediation measures addressing the determined event. As a further example, the response can comprise a change in services provided to the device hosting the event. A sample response would comprise of a notification to a customer that their account will be suspended for suspected fraudulent activities, the identified device may be blocked off infrastructure, or perhaps monitored with more scrutiny as part of a watch list of devices.

As described in greater detail below, an event state can be determined based upon an analysis of a change in a physical and/or logical parameter of a device. As an example, an operational pattern can be used to determine an event state (i.e., whether a particular event has occurred).

Figure 6:
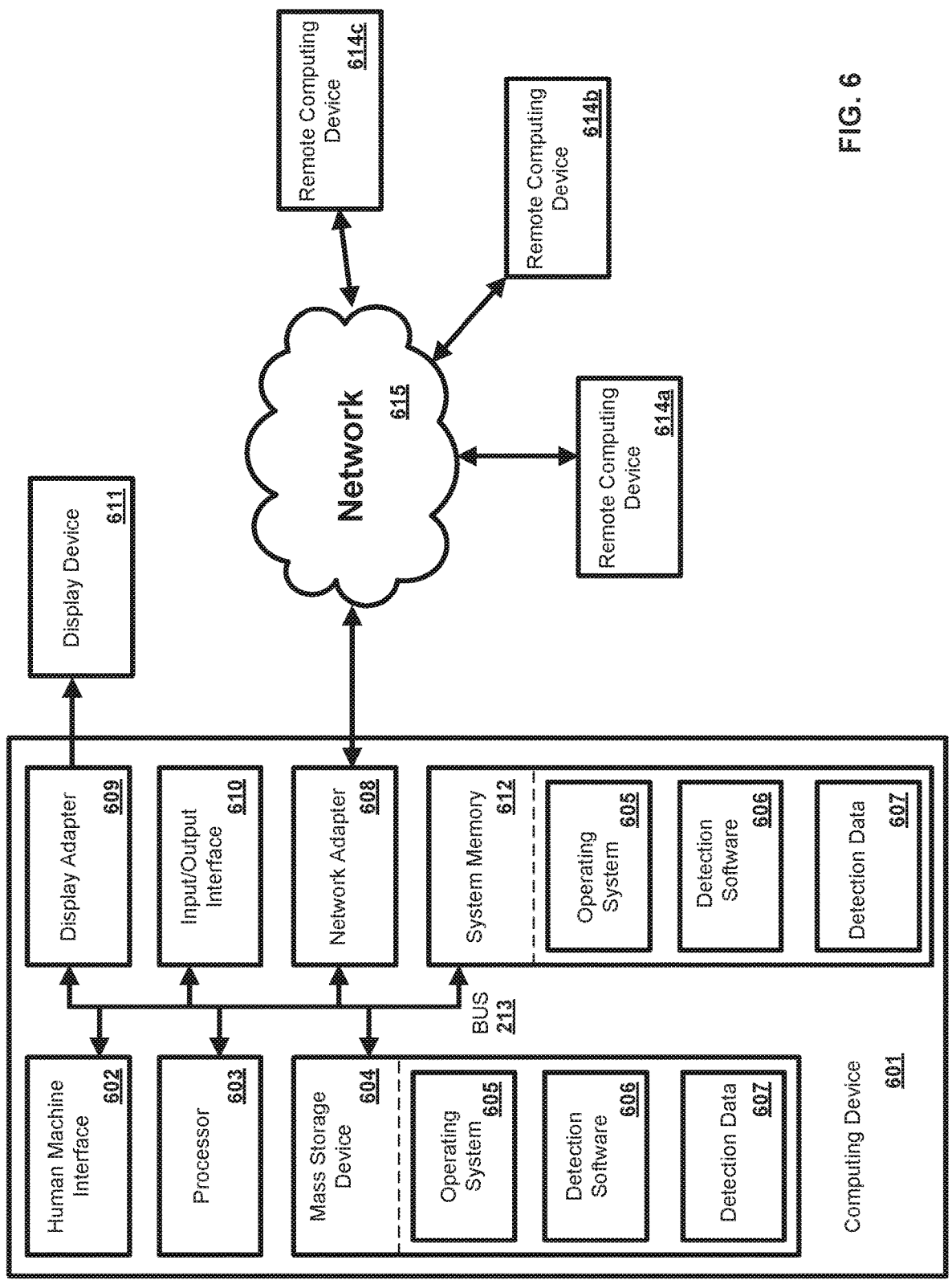
FIG. 6 is a block diagram of an exemplary computing device.

In an exemplary aspect, the methods and systems can be implemented on a computing system such as computing device 601 as illustrated in FIG. 6 and described below. By way of example, one or more of the CT 120, the user device 124, and the detection system 126 of FIG. 2 can comprise a computing device as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, detection software 606, detection data 607, a network adapter 608, system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computing device 601 typically comprises a variety of computer readable media. Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as detection data 607 and/or program modules such as operating system 605 and detection software 606 that are immediately accessible to and/or are presently operated on by the processing unit 603.

In another aspect, the computing device 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computing device 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and detection software 606. Each of the operating system 605 and detection software 606 (or some combination thereof) can comprise elements of the programming and the detection software 606. Detection data 607 can also be stored on the mass storage device 604. Detection data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 601 via an input device (not shown). Examples of such input devices comprise, but are not limited to, a keyboard, pointing device (e.g., a "mouse"), a microphone, a joystick, a scanner, visual systems such as Microsoft's Kinect, audio systems that process sound such as music or speech, a traditional silver remote control, tactile input devices such as gloves, touch-responsive screen, body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computing device 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computing device 601 via Input/Output Interface 610. Any step and/or result of the methods can be output in any form to an output device. Such output can be any form of visual representation, including, but not limited to, textual, graphical, animation, audio, tactile, and the like. The display 611 and computing device 601 can be part of one device, or separate devices.

The computing device 601 can operate in a networked environment using logical connections to one or more remote computing devices 614a,b,c. By way of example, a remote computing device can be a personal computer, portable computer, a smartphone, a server, a router, a network computer, a peer device or other common network node, and so on. Logical connections between the computing device 601 and a remote computing device 614a,b,c can be made via a network 615, such as a local area network (LAN) and a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet. Furthermore, the computing device 601 can communicate information to one or more of the remote computing devices 614a,b,c for data analysis, pattern recognition, and event detection, for example. In an aspect, the detection system 126 can communicate information to one or more of the remote computing devices 614a,b,c (e.g., data center) for one or more of analyzing the alert to determine an appropriate response, aggregating a plurality of received alerts, and filtering a plurality of received alerts.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of detection software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In an aspect, the systems and methods of the present disclosure can use Anomic Motion Detection (AMD) software to run on a particular device (e.g., as part of an embedded OpenCable Application Platform (OCAP) software stack, an operating system).

As an example application, a hacker can plug a USB device into a port of a user device and can attempt to mount the USB device as bootable drive. The detection systems and methods of the present disclosure can match the logged event pattern associated with the coupled USB drive and the attempt to mount the device. In an aspect, the logged event pattern can trigger an alert. As an example, the alert can be transmitted to security operators for processing and/or remediation. Other detectable events can comprise changes to key system files, version control, hot plugs (e.g., USB, eSATA, Serial), device types, connection types (SSH, TCP, UDP, LAN), command line invocation, and excessive network bandwidth use, to name a few.

In an aspect, systems and methods of the present disclosure can comprise an algorithm or other technique to determine the severity of the event and to notify appropriate personnel to investigate accordingly. As an example, an algorithm can evaluate the event based on severity and can assign a high, medium, or low designation.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swami intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, a physical pattern of operation associated with a device;
   determining, based on one or more acceptable patterns of operation of the device, that the physical pattern of operation associated with the device is associated with a pattern of operation corresponding to a security issue;

determining, based on the physical pattern of operation associated with the device being associated with the pattern of operation corresponding to the security issue, one or more remediation measures; and causing the device to implement the one or more remediation measures.

2. The method of claim 1, wherein causing the device to implement the one or more remediation measures comprises sending an indication of the one or more remediation measures to the device.

3. The method of claim 1, wherein the pattern of operation corresponding to the security issue comprises one or more of an unauthorized interaction with a hardware interface associated with the device, one or more unauthorized secure shell (SSH) commands, or one or more unauthorized Telnet commands.

4. The method of claim 1, wherein determining the pattern of operation associated with the device comprises determining a change to an operational process of the device.

5. The method of claim 1, wherein the one or more remediation measures comprise changing one or more services associated with the device.

6. The method of claim 1, wherein the one or more remediation measures comprise suspending one or more services associated with the device.

7. The method of claim 1, wherein the pattern of operation corresponding to the security issue comprises a pattern of physical events.

8. The method of claim 1, wherein determining the pattern of operation associated with the device comprises receiving the pattern of operation from the device.

9. A method comprising:

determining a parameter indicating a pattern of operation associated with a device;

determining a change in the parameter;

determining, based on one or more of the parameter or the change in the parameter, a physical pattern of operation associated with the device;

determining that the physical pattern of operation associated with the device is associated with a pattern of operation corresponding to a security issue;

determining, based on determining that the physical pattern of operation associated with the device is associated with the pattern of operation corresponding to the security issue, one or more remediation measures; and causing the device to implement the one or more remediation measures.

10. The method of claim 9, wherein causing the device to implement the one or more remediation measures comprises sending an indication of the one or more remediation measures to the device.

11. The method of claim 9, wherein the pattern of operation corresponding to the security issue comprises one or more of an unauthorized interaction with a hardware interface associated with the device, one or more unauthorized secure shell (SSH) commands, or one or more unauthorized Telnet commands.

12. The method of claim 9, wherein the one or more remediation measures comprise changing one or more services associated with the device.

13. The method of claim 9, wherein the one or more remediation measures comprise suspending one or more services associated with the device.

14. A method comprising:

determining a parameter indicating a physical pattern of operation associated with a device;

determining, based on the parameter, a security issue;

determining, based on the security issue, an alert; and determining, based on the alert, an alert priority.

15. The method of claim 14, further comprising determining, by a detection element embedded in a software stack associated with the device, the parameter.

16. The method of claim 14, wherein determining the parameter comprises determining a change to an internal process associated with the device.

17. The method of claim 14, further comprising determining, based on the alert priority, one or more remediation measures.

18. The method of claim 14, further comprising determining, based on one or more of an unauthorized interaction with a hardware interface associated with the device, one or more unauthorized secure shell (SSH) commands, or one or more unauthorized Telnet commands, a change to the parameter.

19. The method of claim 17, further comprising causing the device to implement the one or more remediation measures.

20. The method of claim 17, wherein the one or more remediation measures comprise at least one of suspending a service associated with the device or changing one or more services associated with the device.

* * * * *